US012738242B1

(12) United States Patent
Huang

(10) Patent No.: US 12,738,242 B1
(45) Date of Patent: Sep. 15, 2026

(54) DISPLAY DEVICE, DRIVING DEVICE OF DISPLAY PANEL, AND DRIVING METHOD THEREOF

(71) Applicant: HIMAX TECHNOLOGIES LIMITED, Tainan City (TW)

(72) Inventor: Han-Wen Huang, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 19/260,312

(22) Filed: Jul. 4, 2025

(51) Int. Cl.
*G09G 3/34* (2006.01)
*G09G 3/36* (2006.01)

(52) U.S. Cl.
CPC ......... *G09G 3/3453* (2013.01); *G09G 3/3688* (2013.01); *G09G 2310/0275* (2013.01); *G09G 2310/0297* (2013.01); *G09G 2320/0219* (2013.01); *G09G 2320/0233* (2013.01)

(58) Field of Classification Search
CPC .... G09G 3/3453; G09G 3/3688; G09G 3/344; G09G 2310/0275; G09G 2310/0297; G09G 2320/0219; G09G 2320/0233; G02F 1/167
USPC ........................................... 345/214, 98, 107
See application file for complete search history.

(56) References Cited

U.S. PATENT DOCUMENTS

2013/0120353 A1* 5/2013 Tanaka ................. G09G 3/3688 345/214
2017/0323611 A1* 11/2017 Jo ........................ G09G 3/3677
2021/0035518 A1* 2/2021 Yabuki ................. G09G 3/3677
2023/0196980 A1* 6/2023 Lee .......................... G09G 3/20 345/55

* cited by examiner

*Primary Examiner* — Jimmy H Nguyen
(74) *Attorney, Agent, or Firm* — JCIPRNET

(57) ABSTRACT

A display device, a driving device of a display panel and a driving method thereof are provided. The display device includes a display panel with data lines, a timing controller, a latch enable processing circuit, and a source driver. The timing controller provides a latch enable signal. The latch enable processing circuit generates a plurality of latch enable delay signals according to the latch enable signal, and provides a plurality of channel latch delay signals according to the latch enable delay signals. The channel latch delay signals vary with time by a time-varying control signal. The data lines of the display panel are grouped into data channels. The pixel data in the data channels are latched by the source driver. The source driver transfers the pixel data of the data channels while a corresponding one of the channel latch delay signals is enabled.

19 Claims, 8 Drawing Sheets

DISPLAY DEVICE, DRIVING DEVICE OF DISPLAY PANEL, AND DRIVING METHOD THEREOF

BACKGROUND

Technical Field

The present invention generally relates to a driving technology of a display panel, and more particularly to a display device, a driving device of a display panel, and a driving method thereof.

Description of Related Art

In display devices, various types of display panels (e.g., liquid crystal display panels, electronic paper display panels) can present images based on signals provided by driving circuits (e.g., gate drivers, source drivers, timing controllers, etc.). As the display panels are designed to be thinner, lighter, and more compact, spacing between the signal lines (e.g., data lines, scan lines, etc.) has decreased, which leads to the capacitive coupling effect between the signal lines, thereby causing the display abnormalities on the display panels.

For example, when the source driver switches signals on the data lines, the capacitive coupling effect caused by parasitic capacitances on the display panel may induce voltage disturbances on other signal lines (such as the gate low voltage VGL, the common voltage VCOM, etc.) due to the voltage fluctuation resulting from the signal transitions on the data lines. In some cases, the interference may even propagate into other components (such as gate drivers), resulting in functional abnormalities within those components, thereby causing the display abnormalities. This issue is particularly prominent in electronic paper display panels, which typically operate at higher driving voltages compared to other types of display panels (e.g., liquid crystal display panels), making them more susceptible to the aforementioned interference.

SUMMARY

The disclosure provides a display device, a driving device of a display panel, and a driving method thereof, which staggers the switching of data signals on data line channels by using different latch enable delay times, and the latch enable delay time of the signals on the data line channels varies with time, thereby avoiding display abnormalities of the display panel.

A display device according to the disclosure is provided. The display device includes a display panel with a plurality of data lines, a timing controller, a latch enable processing circuit, and a source driver. The timing controller provides a latch enable signal. The latch enable processing circuit is coupled to the timing controller. The latch enable processing circuit generates a plurality of latch enable delay signals according to the latch enable signal, and provides a plurality of channel latch delay signals according to the latch enable delay signals, wherein the channel latch delay signals each have a different delay, one of the channel latch delay signals is one of the latch enable delay signals, and the channel latch delay signals vary with time by a time-varying control signal. The source driver is coupled to the latch enable processing circuit and the display panel. The data lines of the display panel are grouped into a plurality of data channels, pixel data in the data channels are latched by the source driver, wherein the data channels are correspondence with the channel latch delay signals. The source driver transfers the pixel data of the data channels while a corresponding one of the channel latch delay signals is enabled, and parts of enable time points of the channel latch delay signals are staggered according to the latch enable delay signals.

The driving device of the display panel according to the disclosure is provided. The driving device of the display panel includes a timing controller, a latch enable processing circuit, and a source driver. The timing controller provides a latch enable signal. The latch enable processing circuit is coupled to the timing controller. The latch enable processing circuit generates a plurality of latch enable delay signals according to the latch enable signal, and provides a plurality of channel latch delay signals according to the latch enable delay signals, wherein the channel latch delay signals each have a different delay, one of the channel latch delay signals is one of the latch enable delay signals, and the channel latch delay signals vary with time by a time-varying control signal. The source driver is coupled to the latch enable processing circuit and the display panel. Data lines of the display panel are grouped into a plurality of data channels, pixel data in the data channels are latched by the source driver, wherein the data channels are correspondence with the channel latch delay signals. The source driver transfers the pixel data of the data channels while a corresponding one of the channel latch delay signals is enabled, and parts of enable time points of the channel latch delay signals are staggered according to the latch enable delay signals.

The driving method of a display panel according to the disclosure is provided. The driving method includes following steps: generating a plurality of latch enable delay signals according to a latch enable signal provided form a timing controller; providing a plurality of channel latch delay signals according to the latch enable delay signals, wherein the channel latch delay signals each have a different delay, one of the channel latch delay signals is one of the latch enable delay signals, and the channel latch delay signals vary with time by a time-varying control signal; latching pixel data in a plurality of data channels by a source driver, wherein data lines of the display panel are grouped into the data channels; and, transferring the pixel data of the data channels while a corresponding one of the channel latch delay signals is enabled, and parts of enable time points of the channel latch delay signals are staggered according to the latch enable delay signals.

Based on the above, the display device, the driving device of the display panel and the driving method thereof described in the embodiment of the disclosure generate a plurality of latch enable delay signals according to the latch enable signal, and provide a plurality of channel latch delay signals according to the latch enable delay signals. One of the channel latch delay signals is one of the latch enable delay signals, and the channel latch delay signals vary with time by the time-varying control signal. Thus, parts of the enable time points of the channel latch delay signals are staggered according to the latch enable delay signals, thereby avoiding display abnormalities of the display panel. Further, the driving device of the display panel ensures that the average delay signal of the channel latch delay signals in the time period is the same, so as to make the brightness of pixel units on the data channels is uniform.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
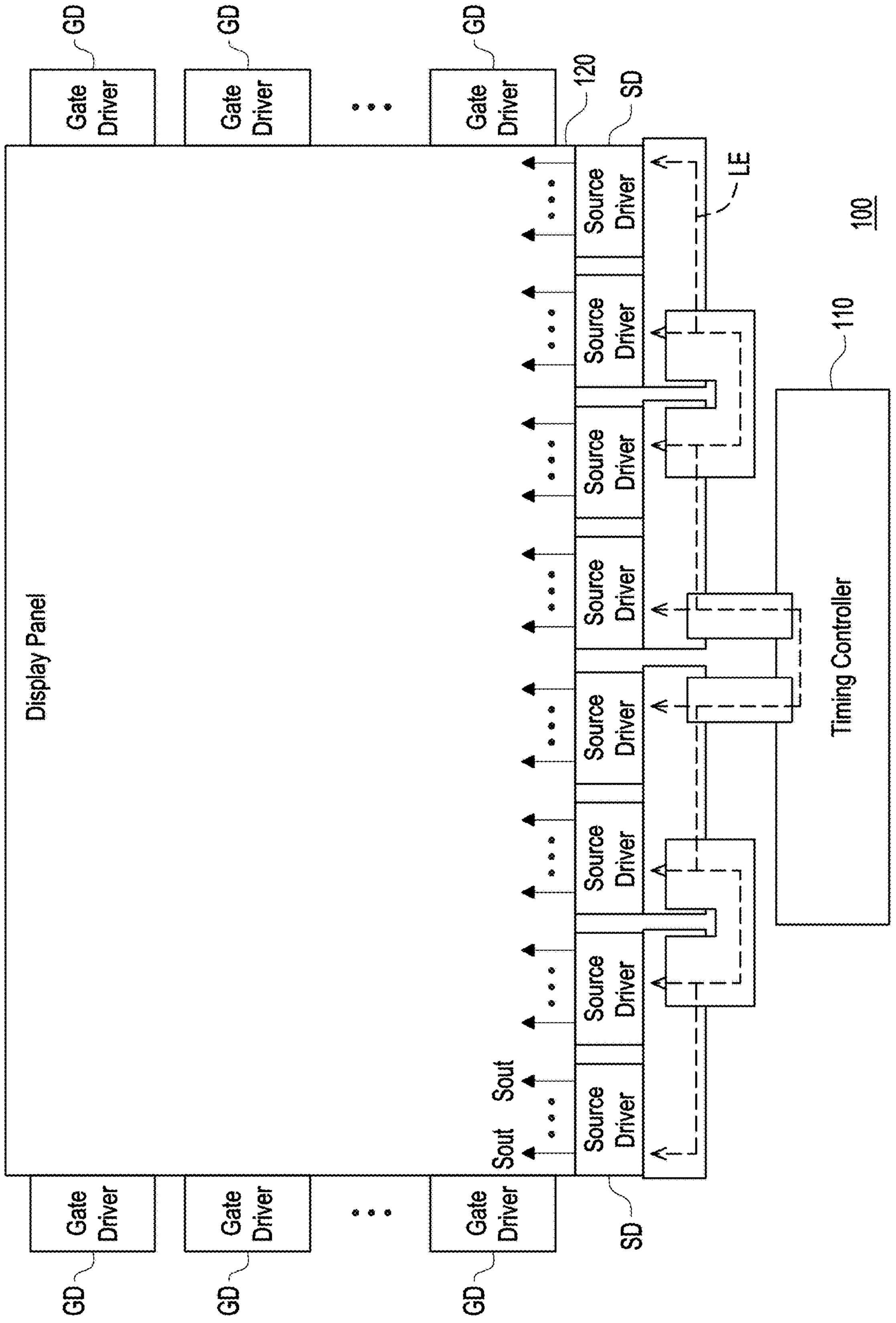
FIG. 1 is a schematic view of a display device according to an embodiment of the disclosure.

FIG. 1 is a schematic view of a display device 100 according to an embodiment of the disclosure. The display device 100 includes a timing controller 110, a display panel 120, data drivers GD, and source drivers SD. The display panel 120 has a plurality of data lines Sout coupled to pixel units respectively. The display panel 120 may be an electronic paper display panel or a liquid crystal display (LCD) display panel. The data drivers GD may be implemented by a gate on array (GOA) technology, a chip on glass (COG) technology, a chip on film (COF) technology, or a chip on film technology, so as to narrow the edge of the display panel, reduce the manufacturing costs, and enhance the driving efficiency of scan lines in the display panel.

Figure 2:
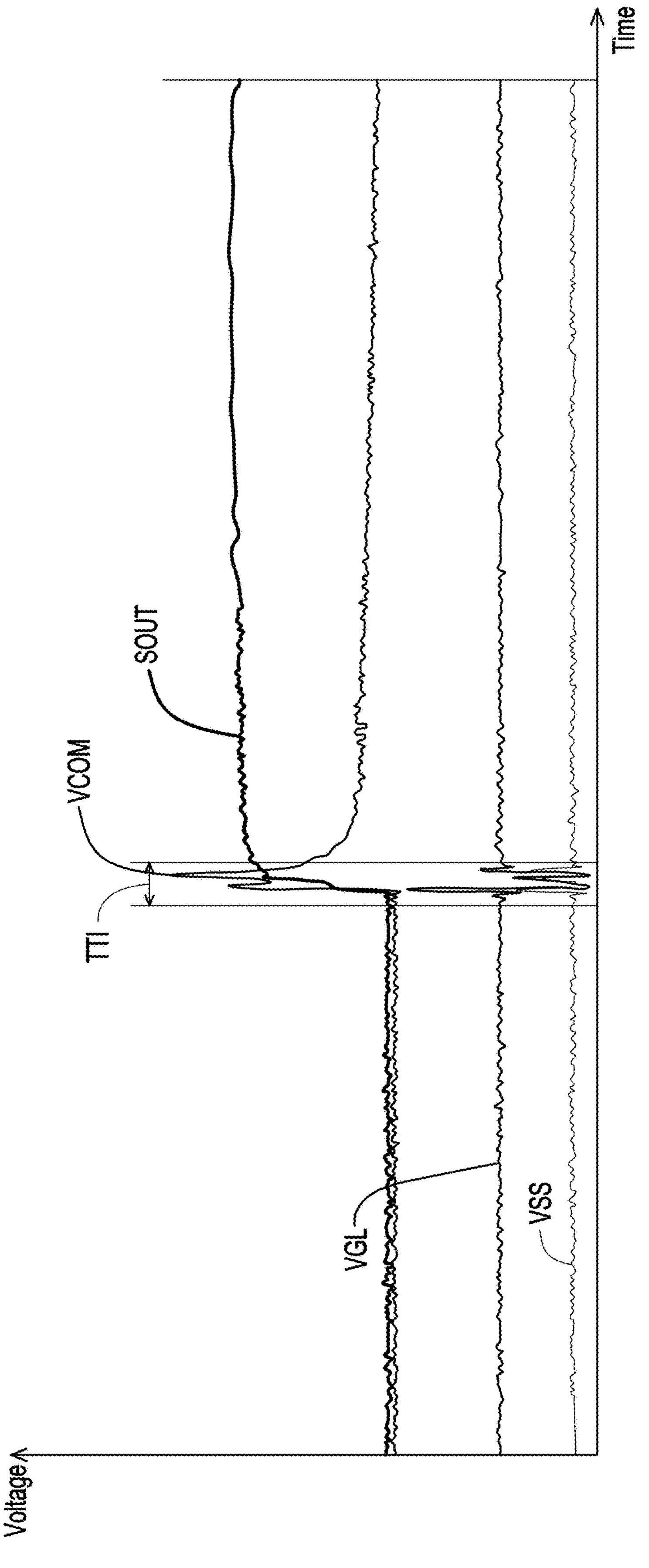
FIG. 2 is a schematic view of signals on the display device while the display abnormalities occur by toggle of data signals according to an embodiment of the disclosure.

The timing controller 110 provides signals (e.g., a clock signal, an output enable signal, data signals with pixel data, a latch enable signal LE) to the data drivers GD and the source drivers SD to present the image on the display panel. The display panel 120 may causes display abnormalities according to the toggle of the data lines Sout. FIG. 2 is a schematic view of signals on the display device while the display abnormalities occur by toggle of data signals according to an embodiment of the disclosure. Take FIG. 2 as an example, while the toggle of the data line Sout occur in the time period TTI, due to the capacitive coupling effect caused by parasitic capacitances on the display panel with glass, signal lines (such as the gate low voltage VGL, the common voltage VCOM, etc.) cause interferences. The interferences may even propagate into other components (such as gate drivers GD), resulting in functional abnormalities within those components, thereby causing the display abnormalities. This issue is particularly prominent in electronic paper display panels, which typically operate at higher driving voltages (e.g., +25V to −25V) compared to other types of display panels (e.g., liquid crystal display panels around +9V to −9V), making them more susceptible to the aforementioned interference.

Figure 3:
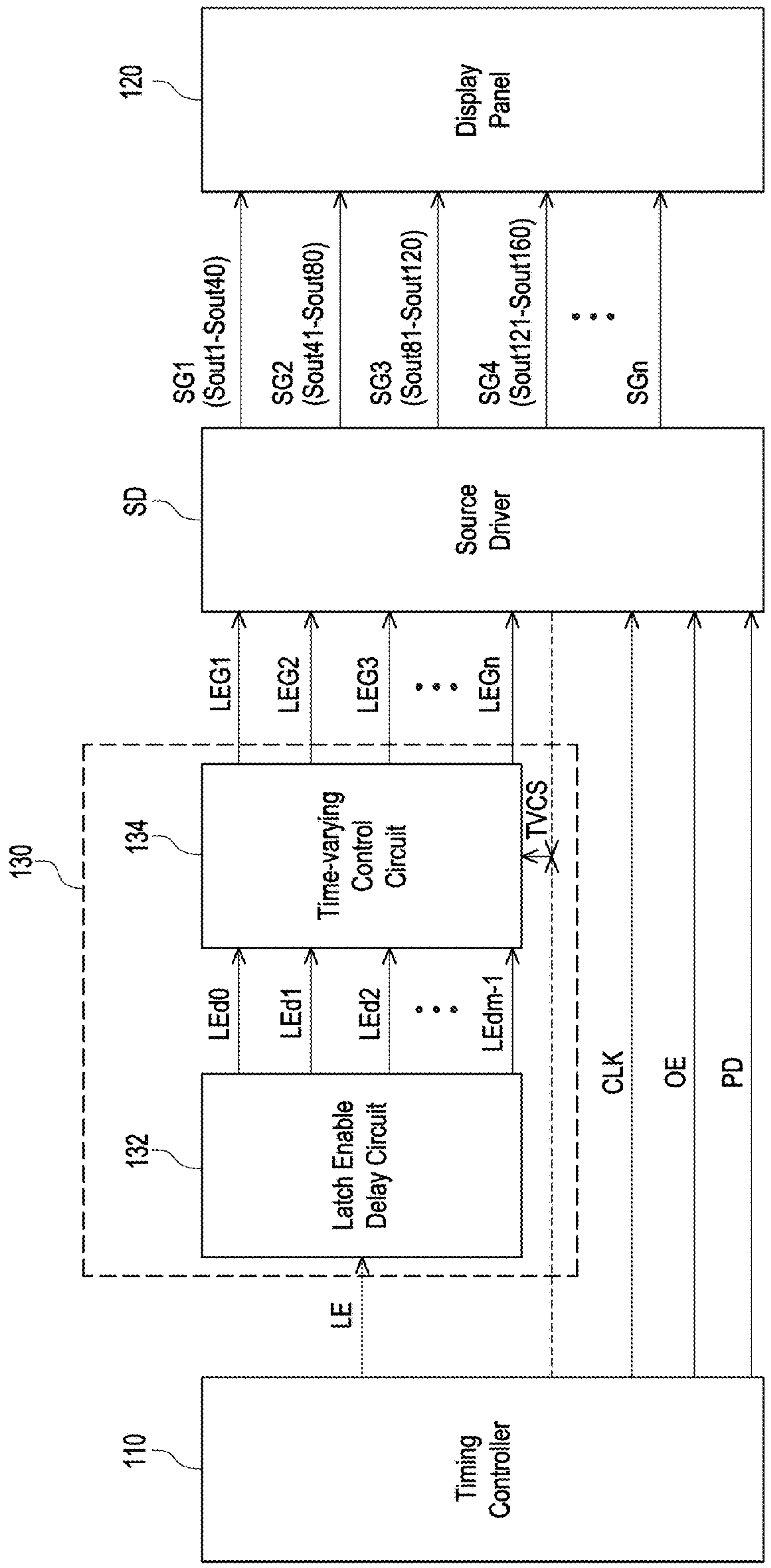
FIG. 3 is a block diagram of a driving device of the display panel according to an embodiment of the disclosure.

FIG. 3 is a block diagram of a driving device of the display panel 120 according to an embodiment of the disclosure. The driving device of the display panel 120 and the display panel 120 combine to form the display device 100 of FIG. 1. The display device 100 includes the timing controller 110, the display panel 120 with a plurality of data lines, a latch enable processing circuit 130, and a source driver SD. The source driver SD in FIG. 3 may be one of the source driver SD in FIG. 1. In the embodiment, the timing controller 110 at least provides a latch enable signal LE, and the timing controller 110 may provide a time-varying control signal TVCS. The timing controller 110 further provides a clock signal CLK, an output enable signal OE, and pixel data PD to the source driver SD. Based on design requirements, the time-varying control signal TVCS may be provided periodically by either the timing controller 110 or the source drivers SD in the embodiment.

The latch enable processing circuit 130 is coupled to the timing controller 110. The latch enable processing circuit 130 provides a plurality of channel latch delay signals LEG1-LEGn according to the latch enable signal LE. In detail, the latch enable processing circuit 130 includes a latch enable delay circuit 132 and a time-varying control circuit 134. The latch enable delay circuit 132 generates the latch enable delay signals LEd0-LEdm−1 according to the latch enable signal LE. The latch enable delay signals LEd0-LEdm−1 each have a different delay. For example, the delay time of the latch enable delay signal LEd0 is less than the delay time of the latch enable delay signal LEd1, the delay time of the latch enable delay signal LEd1 is less than the delay time of the latch enable delay signal LEd2, and so on. The latch enable delay signal LEdm−1 has the longest delay time among the latch enable delay signals LEd0-LEdm−1. In the embodiment, the number m of the channel latch delay signals LEd0-LEdm−1 is a positive integer, such as, m may be set as 6.

Figure 4:
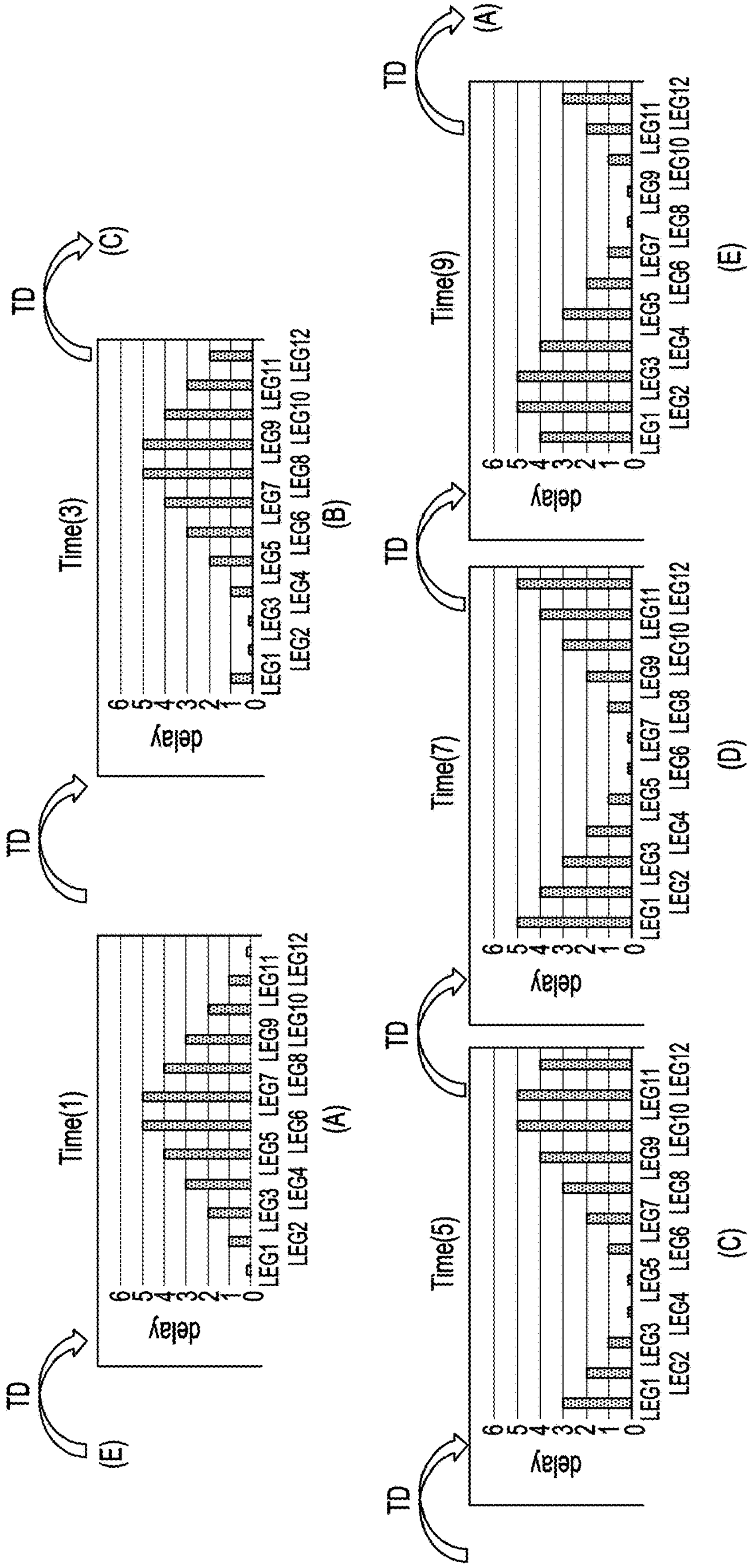
FIG. 4 is a schematic view of the latch enable delay signals and the channel latch delay signals which vary with time by the time-varying control signal according to an embodiment of the disclosure.

The time-varying control circuit 134 is coupled to the latch enable delay circuit 132. The time-varying control circuit 134 provides the channel latch delay signals LEG1-LEGn according to the latch enable delay signals LEd0-LEdm−1 by the time-varying control signal TVCS. One of the channel latch delay signals LEG1-LEGn is one of the latch enable delay signals LEd0-LEdm−1, and the channel latch delay signals LEG1-LEGn varies with time by the time-varying control signal TVCS. The channel latch delay signals LEG1-LEGn is shown in FIG. 4 for example in the embodiment. The time-varying control circuit 134 may be implemented by a multiplexer circuit for implementing the schematic view of FIG. 5A to FIG. 5C. The control node of the multiplexer circuit receives time-varying control signal TVCS. The input nodes of the multiplexer circuit receive latch enable delay signals LEd0-LEdm−1 respectively, and output nodes of the multiplexer circuit generate the channel latch delay signals LEG1-LEGn for the source driver SD.

In FIG. 4, the source driver SD is coupled to the latch enable processing circuit 130 and the display panel 120. The data lines (e.g., data lines Sout1-Sout160) of the display panel 120 are grouped into a plurality of data channels. In the embodiment, one data channel may have 40 data lines. For example, the first data channel SG1 have 40 data lines Sout1-Sout40, the second data channel SG2 have 40 data lines Sout41-Sout80, the third data channel SG3 have 40 data lines Sout81-Sout120, and so on. The channel latch delay signals LEG1-LEGn are correspondence with the data channels SG1-SGn respectively. For example, the channel latch delay signal LEG1 is correspondence with the data channel SG1, the channel latch delay signal LEG2 is correspondence with the data channel SG2, and so on. The source driver SD transfers the pixel data of the data channels SG1-SGn while a corresponding one of the channel latch delay signals LEG1-LEGn is enabled, and parts of enable time points of the channel latch delay signals LEG1-LEGn are staggered according to the latch enable delay signals LEd0-LEdm−1.

FIG. 4 is a schematic view of the latch enable delay signals LEd0-LEdm−1 and the channel latch delay signals LEG1-LEGn which vary with time by the time-varying control signal TVCS according to an embodiment of the disclosure. There are parts (A) to part (E) of FIG. 4 to show delay times of the channel latch delay signals LEG1-LEGn in time points Time(1), Time(3), Time(5), Time(7), and Time(9) for example. The delay times of the channel latch delay signals LEG1-LEGn in time points Time(2), Time(4), Time(6), Time(8), Time(10), Time(11), and Time(12) can be derived from parts (A) to part (E) of the FIG. 4. In the embodiment, the time-varying control circuit 134 provides the channel latch delay signals LEG1-LEGn according to the latch enable delay signals LEd0-LEdm−1 by the time-varying control signal TVCS in each time points Time(1)-Time(12) periodically. The duration spanning from the time point Time(1) to the time point Time(12) is defined as a time period.

Referring to FIG. 4, part (A) of FIG. 4 shows the delay times of the channel latch delay signals LEG1-LEGn in the time point Time(1). In part (A) of FIG. 4, the channel latch delay signals LEG1 and LEG12 are set as the latch enable delay signal LEd0 with delay 0, the channel latch delay signals LEG2 and LEG11 are set as the latch enable delay signal LEd1 with delay 1, the channel latch delay signals LEG3 and LEG10 are set as the latch enable delay signal LEd2 with delay 2, the channel latch delay signals LEG4 and LEG9 are set as the latch enable delay signal LEd3 with delay 3, the channel latch delay signals LEG5 and LEG8 are set as the latch enable delay signal LEd4 with delay 4, and the channel latch delay signals LEG6 and LEG7 are set as the latch enable delay signal LEd5 with delay 5. The delay times of the channel latch delay signals LEG1-LEG12 in part (A) of FIG. 4 exhibit a bell-shaped distribution.

In part (B) of FIG. 4, compared to part (A) of FIG. 4, the delay times on each of the channel latch delay signals LEG1 and LEG10 are shifted two positions to the right relative to those on the channel latch delay signals LEG3 and LEG12, and the two rightmost delay times are sequentially shifted to the two leftmost channel latch delay signals LEG1 and LEG2. For example, the channel latch delay signal LEG1 is set as the latch enable delay signal LEd1 with delay 1, the channel latch delay signal LEG2 is set as the latch enable delay signal LEd0 with delay 0, and so on. Similarly, as previously described, in part (C) to part (E) of FIG. 4, compared to previous part (B) to part (D) of FIG. 4, the delay times on each of the channel latch delay signals LEG1 and LEG10 are shifted two positions to the right relative to those on the channel latch delay signals LEG3 and LEG12, and the two rightmost delay times are sequentially shifted to the two leftmost channel latch delay signals LEG1 and LEG2. In FIG. 4, the time difference TD between the two time points (e.g., the time points Time(1)-Time(2), Time(2)-Time(2), etc.) within the time period is either one or N scan-line-period intervals, or one or N-frame intervals, wherein the N is a positive integer.

Since the display device 100 includes multiple source drivers SD, setting the delay times of the channel latch delay signals LEG1-LEG12 in the bell-shaped distribution and periodically circulating makes it easier for the pixel units along the same scan line on the display panel 120 to have uniform brightness during a whole time period.

Figure 5A:
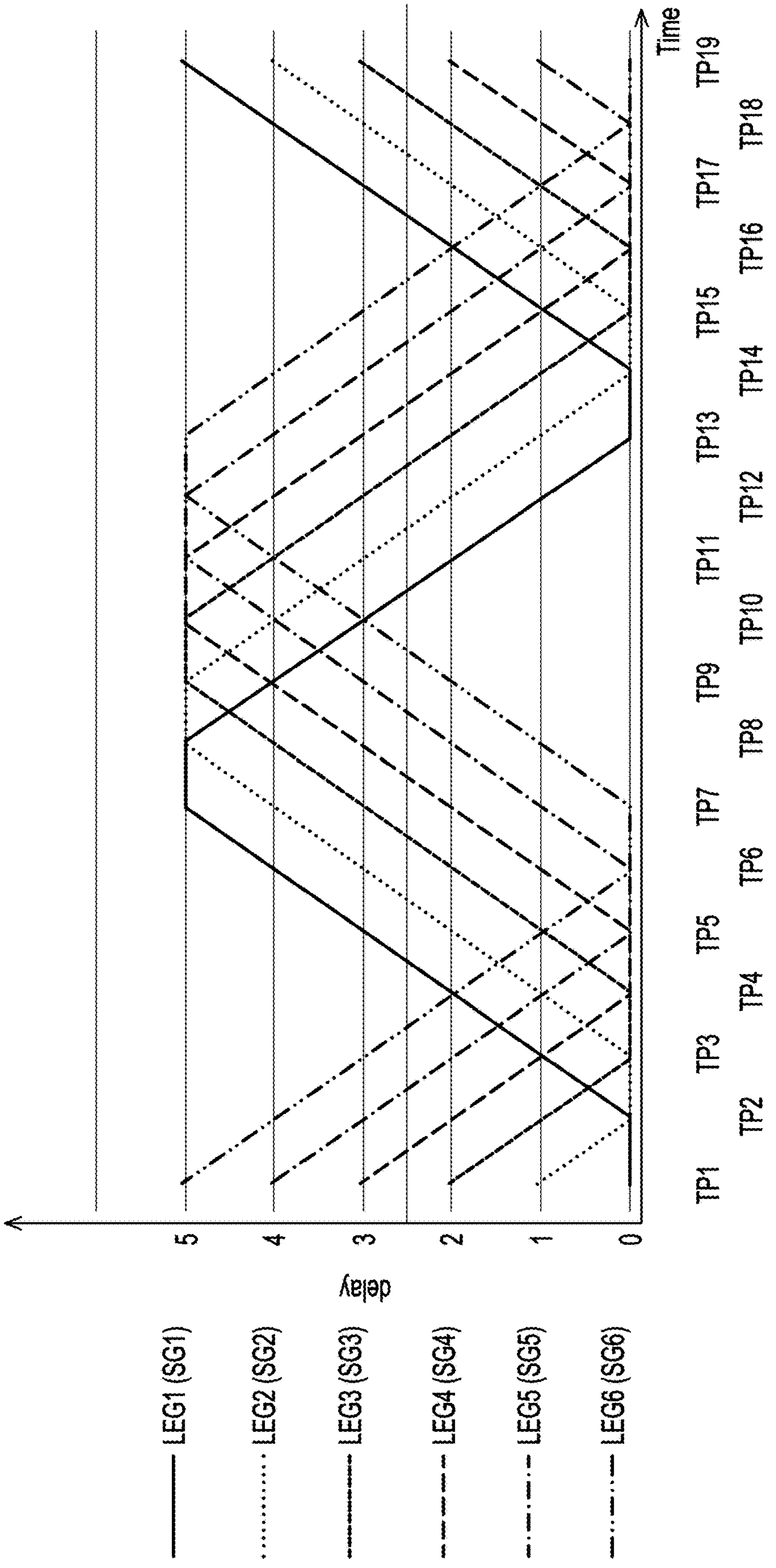
FIGS. 5A, 5B, and 5C are schematic views of the channel latch delay signals and the average delay signal in the time period according to an embodiment of the disclosure.
Figure 5B:
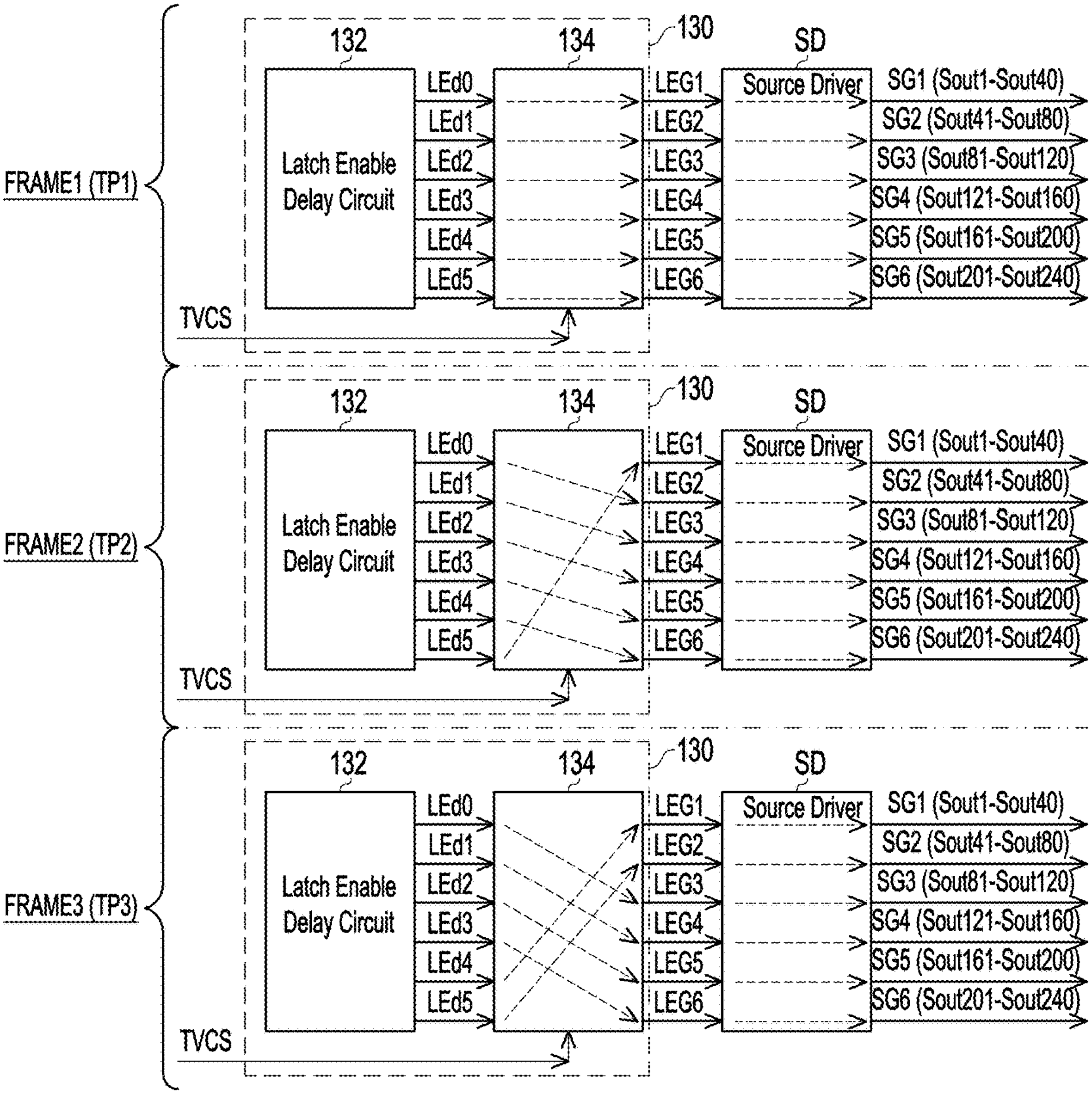
Figure 5C:
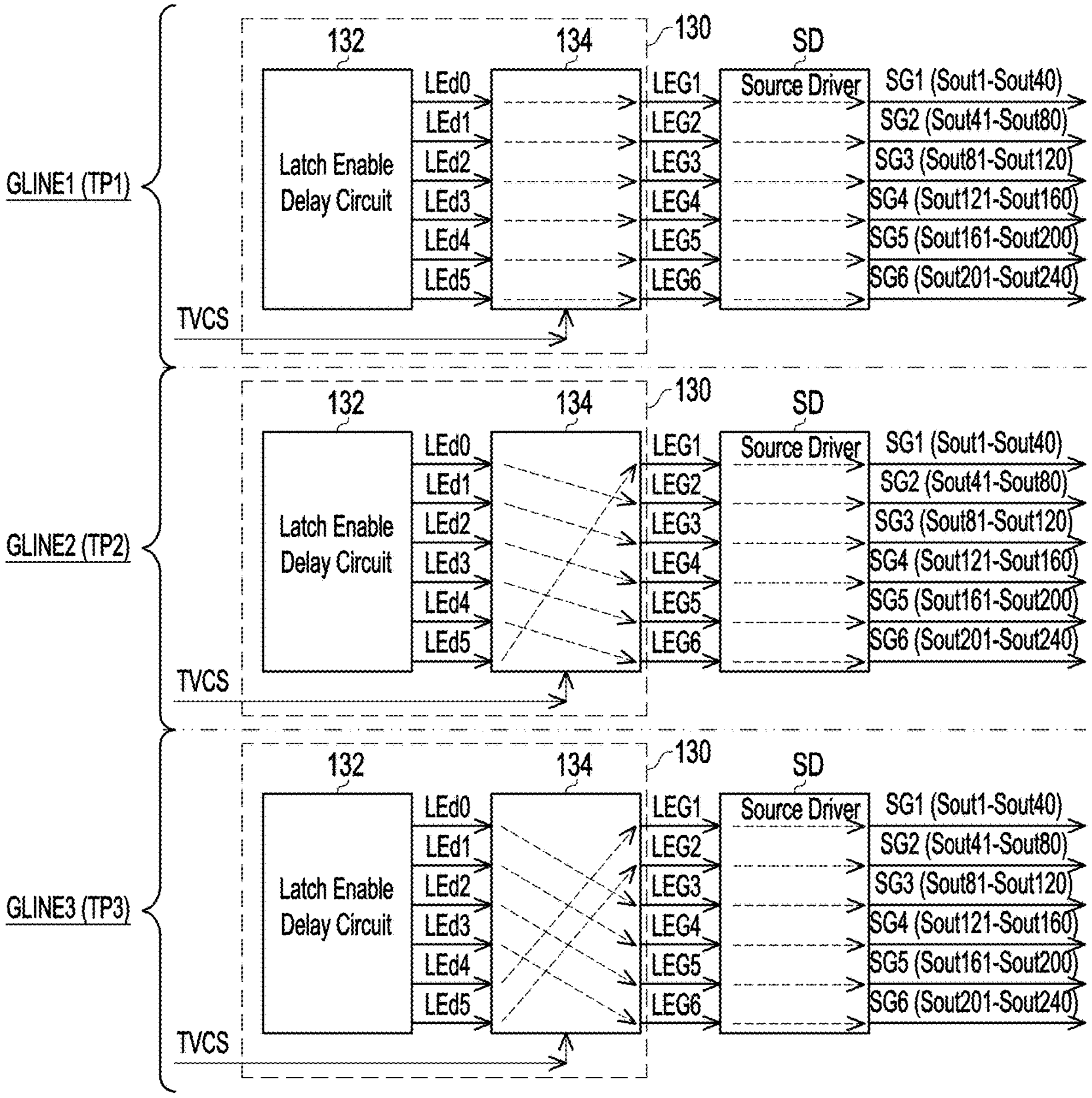

FIGS. 5A, 5B, and 5C are schematic views of the channel latch delay signals LEG1-LEGn and the average delay signal in the time period according to an embodiment of the disclosure. The X-axis of FIG. 5A shows the time points TP1-TP19. The time points TP1-TP19 may be one or more frame intervals, one or more gate line enable time-points, and so on. The Y-axis of FIG. 5A shows the delay 0-5 of the Y-axis of FIG. 4 corresponding to the latch enable delay signals LEd0-LEdm−1 respectively. The time point TP2 may be corresponding to the time point Time(1) in part (A) of FIG. 4. The latch enable processing circuit 130 of FIG. 3 periodically configures the one of the channel latch delay signals LEG1-LEG6 as the one of the latch enable delay signals LEd0-LEdm−1 at a plurality of time points (e.g., the time points TP2-TP13) within the time period, and an average delay signal of the channel latch delay signals LEG1-LEG6 in the time period are the same shown as the line 540, so as to make the brightness of pixel units on the data channels SG1-SG6 is uniform.

FIG. 5B is a schematic view of the latch enable delay signals LEd0-LEd5, the channel latch delay signals LEG1-LEG6, and the data channels SG1-SG6 according to an embodiment of the disclosure while the time points TP1-TP3 are each of the frame intervals FRAME1-FRAME3 as example. In the frame interval FRAME1 of this embodiment, the channel latch delay signal LEG1 is the same as the latch enable delay signal LEd0, the channel latch delay signal LEd2 is the same as the latch enable delay signal LEd1, the channel latch delay signal LEd3 is the same as the latch enable delay signal LEd2, . . . and so on, controlled by the time-varying control signal TVCS via the time-varying control circuit 134. In the frame interval FRAME2 of this embodiment, the channel latch delay signal LEG1 is the same as the latch enable delay signal LEd5, the channel latch delay signal LEd2 is the same as the latch enable delay signal LEd0, the channel latch delay signal LEd3 is the same as the latch enable delay signal LEd1, . . . and so on, controlled by the time-varying control signal TVCS via the time-varying control circuit 134. In the frame interval FRAME3 of this embodiment, the channel latch delay signal LEG1 is the same as the latch enable delay signal LEd4, the channel latch delay signal LEd2 is the same as the latch enable delay signal LEd5, the channel latch delay signal LEd3 is the same as the latch enable delay signal LEd0, . . . and so on, controlled by the time-varying control signal TVCS via the time-varying control circuit 134. In other words, the time points TP1-TP19 of FIG. 5A may be the frame intervals FRAME1-FRAME19 shown in FIG. 5B.

FIG. 5C is a schematic view of the latch enable delay signals LEd0-LEd5, the channel latch delay signals LEG1-LEG6, and the data channels SG1-SG6 according to an embodiment of the disclosure while the time points TP1-TP3 are each of the gate line enable time-points GLINE1-GLINE3 as example. The gate line enable time-point GLINE1 refers to the time at which the gate driver GD of FIG. 1 turns on the first gate line, the gate line enable time-point GLINE2 refers to the time at which the gate driver GD of FIG. 1 turns on the second gate line, the gate line enable time-point GLINE3 refers to the time at which the gate driver GD of FIG. 1 turns on the third gate line, . . . and so on. In the gate line enable time-point GLINE1 of this embodiment, the channel latch delay signal LEG1 is the same as the latch enable delay signal LEd0, the channel latch delay signal LEd2 is the same as the latch enable delay signal LEd1, the channel latch delay signal LEd3 is the same as the latch enable delay signal LEd2, . . . and so on, controlled by the time-varying control signal TVCS via the time-varying control circuit 134. In the gate line enable time-point GLINE2 of this embodiment, the channel latch delay signal LEG1 is the same as the latch enable delay signal LEd5, the channel latch delay signal LEd2 is the same as the latch enable delay signal LEd0, the channel latch delay signal LEd3 is the same as the latch enable delay signal LEd1, . . . and so on, controlled by the time-varying control signal TVCS via the time-varying control circuit 134. In the gate line enable time-point GLINE3 of this embodiment, the channel latch delay signal LEG1 is the same as the latch enable delay signal LEd4, the channel latch delay signal LEd2 is the same as the latch enable delay signal LEd5, the channel latch delay signal LEd3 is the same as the latch enable delay signal LEd0, . . . and so on, controlled by the time-varying control signal TVCS via the time-varying control circuit 134. In other words, the time points TP1-TP19 of FIG. 5A may be the gate line enable time-points GLINE1-GLINE19 shown in FIG. 5C. In the embodiment, the duration of the time points TP1-TP19 of FIG. 5B (e.g., the frame intervals FRAME1-FRAME3) is longer than the duration of the time points TP1-TP19 of FIG. 5C (e.g., the gate line enable time-points GLINE1-GLINE3).

Figure 6:
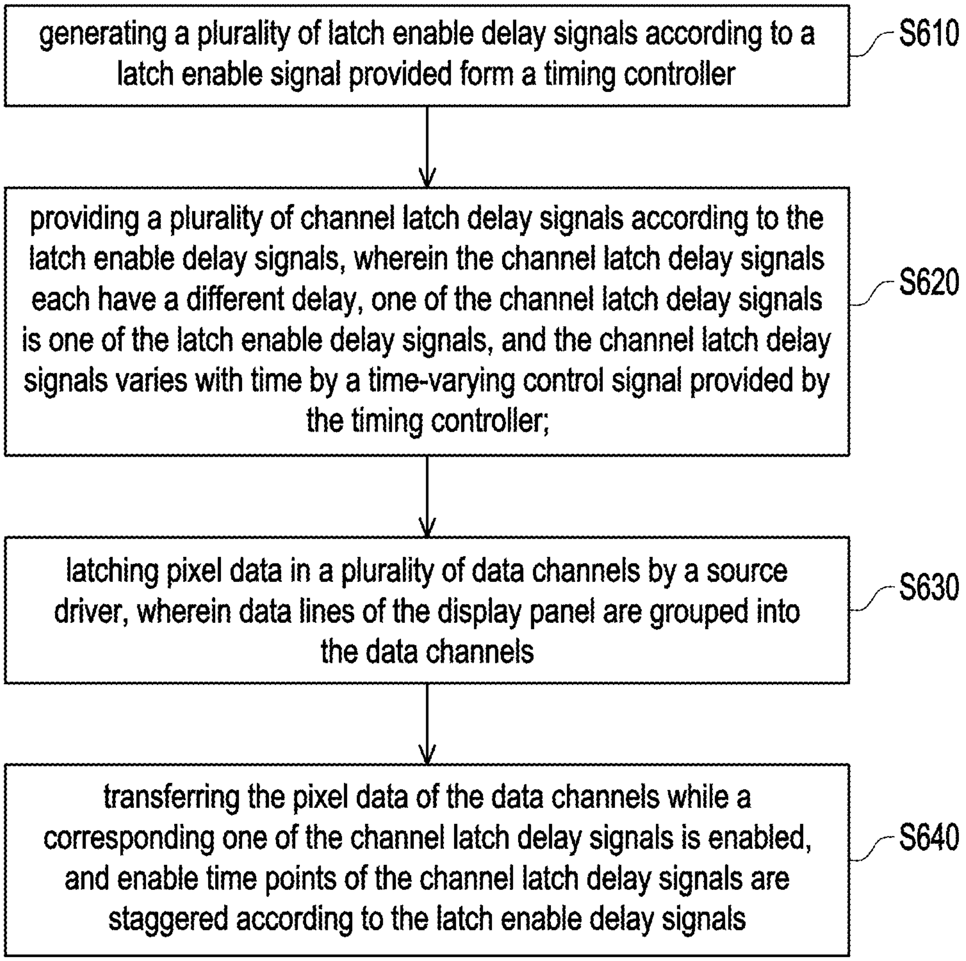
FIG. 6 is a flow chart of a driving method of the display panel according to an embodiment of the disclosure.

FIG. 6 is a flow chart of a driving method of the display panel according to an embodiment of the disclosure. The driving method of the display panel is applied to the display device 100 of FIG. 1 and the driving device of FIG. 3. Referring to FIG. 3 and FIG. 6, in the step S610, the latch enable delay circuit 132 of the latch enable processing circuit 130 generates a plurality of latch enable delay signals LEd0-LEdm−1 according to the latch enable signal LE provided form the timing controller 110 of FIG. 3, wherein the latch enable delay signals LEd0-LEdm−1 each have a different delay. In the step S620, the time-varying control circuit 134 of the latch enable processing circuit 130 provides a plurality of channel latch delay signals LEG1-LEGn according to the latch enable delay signals LEd0-LEdm−1, wherein one of the channel latch delay signals LEG1-LEGn is one of the latch enable delay signals LEd0-LEdm−1, and the channel latch delay signals LEG1-LEGn varies with time by the time-varying control signal TVCS provided by the timing controller 110.

In the step S630, the source driver SD latches pixel data in a plurality of data channels SG1-SGn, wherein data lines Sout of the display panel 120 are grouped into the data channels SG1-SGn. In the step S640, the source driver SD transfers the pixel data of the data channels SG1-SGn while a corresponding one of the channel latch delay signals LEG1-LEGn is enabled, and parts of enable time points of the channel latch delay signals LEG1-LEGn are staggered according to the latch enable delay signals LEd0-LEdm−1. Please may refer to the above embodiments for details of the steps S610-S640 of FIG. 6.

In summary, the display device, the driving device of the display panel and the driving method thereof described in the embodiment of the disclosure generate a plurality of latch enable delay signals according to the latch enable signal, and provide a plurality of channel latch delay signals according to the latch enable delay signals. One of the channel latch delay signals is one of the latch enable delay signals, and the channel latch delay signals vary with time by the time-varying control signal. Thus, parts of the enable time points of the channel latch delay signals are staggered according to the latch enable delay signals, thereby avoiding display abnormalities of the display panel. Further, the driving device of the display panel ensures that the average delay signal of the channel latch delay signals in the time period is the same, so as to make the brightness of pixel units on the data channels is uniform.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a display panel with a plurality of data lines;

a timing controller, providing a latch enable signal;

a latch enable processing circuit, coupled to the timing controller, wherein the latch enable processing circuit generates a plurality of latch enable delay signals according to the latch enable signal, and provides a plurality of channel latch delay signals according to the latch enable delay signals, wherein the latch enable delay signals each have a different delay, one of the channel latch delay signals is one of the latch enable delay signals, and the channel latch delay signals vary with time by a time-varying control signal; and a source driver, coupled to the latch enable processing circuit and the display panel, wherein the data lines of the display panel are grouped into a plurality of data channels, pixel data in the data channels are latched by the source driver, wherein the data channels are correspondence with the channel latch delay signals, the source driver transfers the pixel data of the data channels while a corresponding one of the channel latch delay signals is enabled, and enable time points of the channel latch delay signals are staggered according to the latch enable delay signals.

2. The display device of claim 1, wherein the latch enable processing circuit periodically configures the one of the channel latch delay signals as the one of the latch enable delay signals at a plurality of time points within a time period, and an average delay signal of the channel latch delay signals in the time period are the same.

3. The display device of claim 2, wherein a time difference between the two time points within the time period is one or N scan-line-period intervals or one or N-frame intervals, wherein the N is a positive integer.

4. The display device of claim 1, wherein the latch enable processing circuit comprising:

a latch enable delay circuit, generates the latch enable delay signals according to the latch enable signal, wherein the channel latch delay signals each have the different delay; and a time-varying control circuit, coupled to the latch enable delay circuit, provides the channel latch delay signals according to the latch enable delay signals by the time-varying control signal.

5. The display device of claim 4, wherein the time-varying control circuit is implemented by a multiplexer circuit, a control node of the multiplexer circuit receives time-varying control signal, input nodes of the multiplexer circuit receive latch enable delay signals respectively, and output nodes of the multiplexer circuit generate the channel latch delay signals for the source driver.

6. The display device of claim 1, wherein the display panel is an electronic paper display panel.

7. The display device of claim 1, wherein the time-varying control signal is provided by the timing controller or the source driver.

8. A driving device of a display panel, comprising:

a timing controller, providing a latch enable signal;

a latch enable processing circuit, coupled to the timing controller, wherein the latch enable processing circuit generates a plurality of latch enable delay signals according to the latch enable signal, and provides a plurality of channel latch delay signals according to the latch enable delay signals, wherein the latch enable delay signals each have a different delay, one of the channel latch delay signals is one of the latch enable delay signals, and the channel latch delay signals vary with time by a time-varying control signal; and a source driver, coupled to the latch enable processing circuit and the display panel, wherein data lines of the display panel are grouped into a plurality of data channels, pixel data in the data channels are latched by the source driver, wherein the data channels are correspondence with the channel latch delay signals, the source driver transfers the pixel data of the data channels while a corresponding one of the channel latch delay signals is enabled, and enable time points of the channel latch delay signals are staggered according to the latch enable delay signals.

9. The driving device of claim 8, wherein the latch enable processing circuit periodically configures the one of the channel latch delay signals as the one of the latch enable delay signals at a plurality of time points within a time period, and an average delay signal of the channel latch delay signals in the time period are the same.

10. The driving device of claim 9, wherein a time difference between the two time points within the time period is one or N scan-line-period intervals or one or N-frame intervals, wherein the N is a positive integer.

11. The driving device of claim 8, wherein the latch enable processing circuit comprising:

a latch enable delay circuit, generates the latch enable delay signals according to the latch enable signal, wherein the channel latch delay signals each have the different delay; and a time-varying control circuit, coupled to the latch enable delay circuit, provides the channel latch delay signals according to the latch enable delay signals by the time-varying control signal.

12. The driving device of claim 11, wherein the time-varying control circuit is implemented by a multiplexer circuit, a control node of the multiplexer circuit receives time-varying control signal, input nodes of the multiplexer circuit receive latch enable delay signals respectively, and output nodes of the multiplexer circuit generate the channel latch delay signals for the source driver.

13. The driving device of claim 11, wherein the display panel is an electronic paper display panel.

14. The driving device of claim 11, wherein the time-varying control signal is provided by the timing controller or the source driver.

15. A driving method of a display panel, comprising:

generating a plurality of latch enable delay signals according to a latch enable signal provided form a timing controller, wherein the latch enable delay signals each have a different delay;

providing a plurality of channel latch delay signals according to the latch enable delay signals, wherein the latch enable delay signals each have a different delay, one of the channel latch delay signals is one of the latch enable delay signals, and the channel latch delay signals vary with time by a time-varying control signal;

latching pixel data in a plurality of data channels by a source driver, wherein data lines of the display panel are grouped into the data channels; and transferring the pixel data of the data channels while a corresponding one of the channel latch delay signals is enabled, and parts of enable time points of the channel latch delay signals are staggered according to the latch enable delay signals.

16. The driving method of claim 15, wherein one of the channel latch delay signals is periodically configured as the one of the latch enable delay signals at a plurality of time points within a time period, and an average delay signal of the channel latch delay signals in the time period are the same.

17. The driving method of claim 16, wherein a time difference between the two time points within the time period is one or N scan-line-period intervals or one or N-frame intervals, wherein the N is a positive integer.

18. The driving method of claim 15, wherein the display panel is an electronic paper display panel.

19. The driving method of claim 15, wherein the time-varying control signal is provided by the timing controller or the source driver.

* * * * *